G. A. STEWART.
WRENCH.
APPLICATION FILED NOV. 22, 1911.
1,033,839.
Patented July 30, 1912.
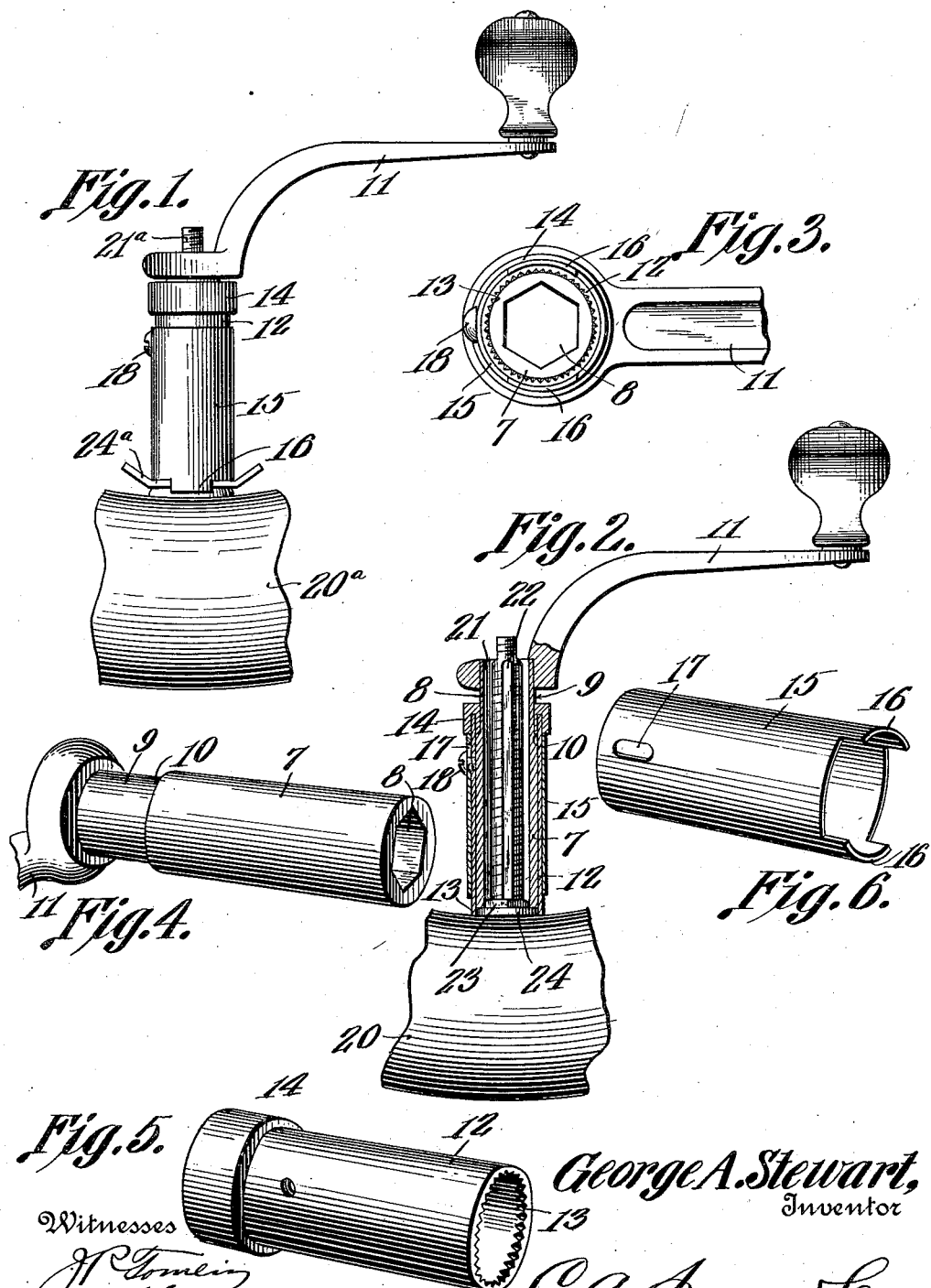
George A. Stewart,
Inventor
Witnesses
Attorneys

UNITED STATES PATENT OFFICE.

GEORGE A. STEWART, OF RIDLEY PARK, PENNSYLVANIA.

WRENCH.

1,033,839.　　　　　　　Specification of Letters Patent.　　Patented July 30, 1912.

Application filed November 22, 1911.　Serial No. 661,811.

*To all whom it may concern:*

Be it known that I, GEORGE A. STEWART, a citizen of the United States, residing at Ridley Park, in the county of Delaware and State of Pennsylvania, have invented a new and useful Wrench, of which the following is a specification.

This invention relates to wrenches, and has for its object to provide means for conveniently loosening and removing nuts from the valve tubes or barrels of pneumatic tires.

It is standard practice to secure the valve barrels or tubes to pneumatic tires by means of a nut screw threaded upon the barrel or tube to clamp a non-rotatable washer against the outer face of the tire, thus tightly gripping the tire between the said washer and the inner portion of the valve. To remove the valve from the tire, it is therefore necessary to remove the clamping nut, which under present conditions is usually a difficult matter, especially upon the nut or valve barrel becoming rusted. This objection is increased for the reason that the tire being constructed of rubber or similar material does not present substantial means for holding the valve barrel against rotation when pressure or force is applied to the nut, and to release the nut, it is therefore necessary to clamp the washer in some manner to prevent the rotation of the valve barrel. These difficulties have been overcome by the provision of a socket engageable with the nut having a sleeve thereon engageable with the washer, whereupon the valve barrel may be held against rotation by holding the sleeve and upon the socket being rotated the nut may be unscrewed.

The present invention also embodies means for engaging either a circular washer, or a non-circular washer, such as are in common use, by the provision of an inner sleeve slidable upon the socket and an outer sleeve slidable upon the inner sleeve, the respective sleeves being provided with means to engage either a circular washer or a non-circular washer by sliding same to extend the ends thereof beyond the socket as will be more fully described hereinafter.

The invention is illustrated in the accompanying drawings, wherein similar reference characters indicate similar parts, and wherein,—

Figure 1 is an elevation of the wrench showing the same in application to a tire having a non-circular washer of customary construction. Fig. 2 is a longitudinal sectional view of the wrench, parts shown in full, as applied to a tire having a circular washer. Fig. 3 is an end view of the wrench, parts broken away. Figs. 4, 5 and 6 are perspectives of details.

Referring in detail to the drawings, the nut socket is designated at 7 having the non-circular, in this case hexagonal, recess 8 passing throughout the length thereof and having one end thereof reduced as at 9 to form a shoulder 10. A crank 11 is secured to the reduced end 9 of the socket 7 and on the socket is slidably mounted an inner sleeve 12 which has the outer end serrated around its inner edge as designated at 13. A ring 14 is slidably mounted upon the reduced end 9 of the socket between the shoulder 10 and the crank 11 and is secured to the inner end of the sleeve 12, the said sleeve fitting into an annular recess in the said ring. The ring 14 being slidable between the crank 11 and the shoulder 10 permits of a limited longitudinal movement of the sleeve 12 whereby the serrated end 13 thereof may be extended or retracted beyond the outer end of the socket 7. An outer sleeve 15 is mounted on the sleeve 12 and has a longitudinal slot 17 therein through which a screw 18 is passed to engage the inner sleeve, thus permitting a limited longitudinal sliding movement of the sleeve 15 relative to the sleeve 12 but constraining the said sleeves from rotation with respect to each other. The sleeve 15 is provided at its outer end with a pair of projecting lips 16. The lips of the sleeve 15 may be extended beyond the outer end of the socket by sliding the sleeve 15 outward, or may be retracted by sliding the sleeve inward.

To illustrate the application of the wrench, there have been shown at 20 and 20ᵃ fragmental portions of two tires having the respective valve barrels 21 and 21ᵃ, the former being provided with a circular washer 24 and the latter being provided with a non-circular washer 24ᵃ of usual construction wherein the sides thereof are straight and the ends upturned. Referring to Fig. 2, the washer 24 is constrained against rotation upon the valve barrel 21 by engaging a flattened portion 22 thereof, as is common in the art, and the nut 23 is engaged on the valve barrel 21 to clamp the washer 24 against the tire 20. To loosen and remove the nut 23 the socket 7 is placed over the valve barrel 21 to engage the nut 23 and the inner sleeve 12 is slid outwardly causing the serrated end thereof to extend beyond the end of the socket and engage or bite the periphery of the washer 24. Thus by holding the sleeve 15 and by turning the crank 11 the nut may be rotated upon valve to loosen same, and the said nut may be ejected from the other end of the socket.

In use with the other form of washer as shown in Fig. 1, the socket is applied in a similar manner, the inner sleeve 12 being slid inwardly and the outer sleeve 15 being slid outwardly to cause the lips 16 to be extended beyond the end of the socket and engage over the sides of the washer 24ª whereby the washer and valve barrel may be held against rotation to permit the crank to be rotated to loosen and remove the nut. It will be noted that in both cases as the socket is rotated the nut in being rotated upon the valve barrel travels in the socket and in reaching the other end thereof is ejected therefrom and the socket 7 being of a length approximately equal to that of the valve barrel removes the nut from the said barrel. This invention is not only applicable to loosen and remove nuts from valve barrels of this character but may be used in an opposite manner to screw the nuts into position to clamp the valve barrels against the tire.

This invention is capable of inexpensive manufacture, and in its use is both efficient and convenient, and it is to be understood that the same is susceptible of alterations in its details within the scope of the appended claims without departing from the spirit of the invention or sacrificing any of the benefits derived thereby.

What is claimed as new is:—

1. In a wrench of the character described, a nut socket and a pair of washer engaging sleeves thereon slidable relative to each other and the socket and constrained against rotation relative to each other, whereby the respective sleeves may be extended beyond the end of the socket.

2. In a wrench of the character described, a socket, an inner washer-engaging sleeve mounted on the socket, an outer washer engaging sleeve arranged on the inner sleeve and having a longitudinal slot therein, and a member passing through the said slot and engaging the inner sleeve, whereby the respective sleeves may be extended beyond the end of the socket.

3. In a wrench of the character described, a socket having one end thereof reduced in diameter, forming a shoulder, a crank secured to the said reduced end, an inner sleeve mounted on the socket, a ring slidable on the reduced end of the socket and secured to the end of the said sleeve, the other end of the sleeve being serrated to bite a circular washer, an outer sleeve arranged on the inner sleeve and having a longitudinal slot therein and lips projecting from the end thereof, and a screw passing through the said slot and engaging the inner sleeve, whereby the respective sleeves may be extended beyond the end of the socket to engage either a circular or a non-circular washer.

4. In a wrench of the character described, a nut socket having a non-circular recess extending throughout its length, and a washer engaging sleeve on the said socket.

In testimony that I claim the foregoing as my own, I have hereto affixed my signature in the presence of two witnesses.

GEORGE A. STEWART.

Witnesses:
C. SCOTT RICKARDS,
JOHN H. WARD.

Copies of this patent may be obtained for five cents each, by addressing the "Commissioner of Patents, Washington, D. C."